Reissued Sept. 7, 1948 Re. 23,037

UNITED STATES PATENT OFFICE 23,037

SPOTTING PASTE

Leon Adler, St. Louis, Mo.

No Drawing. Original No. 2,396,667, dated March 19, 1946, Serial No. 406,438, August 11, 1941. Application for reissue May 17, 1946, Serial No. 670,335

2 Claims. (Cl. 106—272)

This invention relates to improvements in metal-working generally, but more particularly to improvements in the hand-finishing operations performed on surfaces or contours of pieces of work of various types and kinds, as for example, in the trueing up of new or replacement bearing surfaces, in die-sinking, or the like.

One of the principal objects of my invention is to produce a high-spotting paste to be used when trueing such surfaces, from time to time as needed during the scraping operations on the latter, the paste being of such a character or composition that it will not oxidize or dry out.

Another object of my invention is to produce a paste of the kind described, which will be so intensely colored that only a small amount of the same, spread in an extremely thin layer or film need be applied to the parts to be readily and sufficiently distinguishable on the work, and to thereby permit of rapid and positive assurance as to the location of the exact spots that must be scraped down.

An added object of my invention is to incorporate into such a paste, an oil-soluble coloring agent or a highly amorphous palpable coloring agent containing no gritty or crystalline substances after intermixture into its carrier, and which might be deposited on the work being spotted, thus insuring that the master plate or gage will not be scratched or otherwise damaged or ruined rapidly through use.

A still further object of this invention is to provide a spotting paste having a color-carrying oil or wax that is non-drying, such as that derived from a mineral source, as from petroleum, or a base that is made non-oxidizing or inhibited from drying, whereby the same will not dry out on the work or on the master bearing surface or test gage surface when left exposed or in the open, for days and even months at a time.

Other objects of my invention are the production of a mechanic's spotting paste or testing paste of the kind described, which will be simple in its composition, effective in its use, that will result in the saving or minimizing of non-productive labor and thereby give more effective work per artisan per given work period, and which will be otherwise satisfactory and efficient for use wherever deemed applicable.

To this end, my invention consists in the novel composition of matter described herein, and the product obtained through such intermixture, as will be more clearly pointed out in the claims hereunto appended.

In metal-working, many kinds of bearing surfaces for new machines, and replacement bearing surfaces for old machines, and for certain die-sinking operations and the like, require that the final trueing up of these surfaces must be done by hand, in a scraping operation, in order to insure a true and accurate surface on the job.

In doing this work, the high spots are first located or spotted and are then smoothed down to the proper contour or level by scraping with a hand-actuated tool. The locating of these high spots is accomplished by applying a transferable colored paste, most often colored blue, to the test surface of a master or gage plate, template, type, or other bearing surface whose surface is known to be accurate and true. This test surface may be of various shapes dependent upon the particular shape of the bearing being formed, as for example, it may be a straight edge, a flat plate, a shaft, and the like, in machine work generally, or a type or template, or the like, in die-sinking.

The test piece, after having this colored spotting paste applied to the test area thereof, is rubbed onto the complementary work surface being produced, whereupon this colored paste is thereby transferred to the pronounced high spots of the latter. Then, and as a result of this transfer, the areas thus indicated by the colored high-spots are scraped off or honed down with some sort of a hand scraping tool. Thereafter, the surface is re-tested by applying thereto, and in the same manner as just set forth, the paste-covered master, template, or like test piece, whereupon the high spots still remaining are again indicated by the transferred spots of colored paste.

These testing, scraping, re-testing and re-scraping operations are gone through again and again, until the surface being formed shows a uniform transfer of color of spotting paste, whereupon said surface is considered finished and true. Even very large bearing surfaces of many machines and parts of machines, such as of lathes, grinders, milling machines, shapers, drills, and the like, these bearing surfaces being flat, round, or of any other type or contour, are hand-scraped and tested in this delicate, tedious and obviously expensive manner.

The paste heretofore used for this testing was made by grinding or otherwise incorporating Prussian blue or other similarly crystalline paint pigments into linseed oil or other drying oil, generally of a vegetable origin, this pigment comprising about from 20% to 30% (by volume) of the paste mixture. This paste had a tendency to dry out rather quickly, and when it dried on the master gage it meant that the workman had to clean off this accumulated dried mass or coating each time that he commenced his day's work, and afterwards to re-blue the gage with a fresh coating. This necessary, but non-profitable work, meant that the costs in the shop were thereby increased.

In the spotting paste which I have devised, the film will not oxidize or dry out, even over many months at a time, but upon the contrary, will remain sufficiently wet and transferrable, so that there need be no time out for any cleaning or re-coating of the master gage. No matter how long my improved paste is left on the latter, or on the work, it remains wet. Thus, the time saved by the workman can be used in actual scraping time. The savings are appreciable, especially through the year, and it should be borne in mind that it is the highest paid artisans who perform this work.

Further, there is less wear and tear on the master gage or plate, thereby permitting the latter to remain in better condition during its effective life, and increasing such life.

There are several ways and various proportions of ingredients that may make up the composition embodied by my invention, but the principal thing to be borne in mind is that the spotting paste thereby produced shall comprise a coloring substance carried in a paste that is of itself non-drying, or which has had added thereto an anti-oxidant or a drying inhibitor, such as for example a condensation product of acetone and paramido-diphenyl.

I have found that the oil-soluble dyes, or dye bases properly prepared so as to make them oil-soluble, are very good coloring substances in this instance, and for a carrier or diluent I intermix the same with some mineral-derived oil or wax, the selection of the coloring substances being such that it will be entirely dispersed or dissolved in the carrier.

To this end, a suggested composition may be made in substantially the following manner and of substantially the ingredients and proportions indicated, although said proportions are rather flexible, inasmuch as some artisans like a thicker than do others, or a more or less intensely colored paste:

| | Pounds |
|---|---|
| Oil-soluble dye | 1 to 3 |
| Petrolatum | 30 |
| Paraffine wax | 1 |

Although blue dye is generally used, simply because those in the trade have come to accept this color, it is obvious that if for any reason there is need for a different color, all that is required is the substitution of the preferred color of oil dye for the blue one.

The coloring material is added to the petrolatum and other materials, and while stirring, the mixture is heated to about 100° C. and held there for about an hour and then cooled to room temperature.

If desired, some other non-drying carrier may be substituted in whole or in part for the carrier just described, or a carrier that contains a drying inhibitor may be used, such as for example by the addition of the inhibitor that is a condensation product of acetone and paramido-diphenyl previously mentioned.

Although the amounts of Prussian blue generally intermixed into the usual vegetable-derived (readily drying) carrier to make spotting paste, is nearly one-half of the bulk of the mixture itself, yet the spot of color transferred will not be as intense as that from my improved composition wherein only about 3% to 10% of coloring substance is in the mixture. Hence, only a very thin film of my improved paste need be used to make the spotting readily perceptible. This is not only a direct saving in the coloring agent itself in the compounding, but it is obvious that with a finer or thinner film it is possible to work to more accurate measurements because there is more nearly a metal-to-metal contact, and there are no discrete or crystalline particles of coloring matter that may lodge between the two complementary surfaces.

The crystalline nature inherent in Prussian blue tends to grind, cut or otherwise similarly damage the test surface, although slowly, over long periods of time, thus destroying the usefulness and reliability of the latter, as time goes on.

Having thus described my invention, it is to be understood that various immaterial changes may be made in the same without departing from the spirit of my invention; hence I do not limit myself to the exact form, ingredients and composition herein shown and described, except as limited by the state of the art to which this invention appertains, or the claims hereunto appended.

What I claim as new and desire to secure by Letters Patent is:

1. A testing paste composition for use with a master standard piece to visibly indicate places of contour deviation of a work piece therefrom, said paste being non-hardening, non-drying and non-volatile and consisting of paraffine wax modified with a substantially non-volatile pasty petrolatum and constituting the dominant ingredients, and a small amount of a dissolved dye to color the paste throughout.

2. A coating composition for applying to a master standard piece to visibly indicate contour deviation of a workpiece therefrom, said composition being non-hardening, non-drying and non-volatile and consisting essentially of the following ingredients in about the following proportions:

| | Pounds |
|---|---|
| Oil-soluble dye | 1 to 3 |
| Petrolatum | 30 |
| Paraffine wax | 1 |

LEON ADLER.

REFERENCES CITED

The following references are of record in the file of this patent:

UNITED STATES PATENTS

| Number | Name | Date |
|---|---|---|
| 81,912 | Kuhn | Sept. 8, 1868 |
| 156,684 | Thompson | Nov. 10, 1874 |
| 1,082,099 | Putnam | Dec. 23, 1913 |
| 1,605,041 | Kritchevsky | Nov. 2, 1926 |
| 2,010,436 | McClave et al. | Aug. 6, 1935 |

FOREIGN PATENTS

| Number | Country | Date |
|---|---|---|
| 118,435 | Great Britain | Aug. 26, 1918 |

OTHER REFERENCES

American Druggist Formula Compendium, 1934, page 4.

2896 Formulas for Pharmacists, 1928, page 57.

Martindale: The Extra Pharmacopeia, 21st ed., 1936, vol. I, pages 249 and 720.

Manufacturing Chemist, Feb. 1934, pages 52–53.